(12) United States Patent
Hoffmann et al.

(10) Patent No.: US 6,748,917 B1
(45) Date of Patent: Jun. 15, 2004

(54) DIRECT INJECTION SPARK IGNITION ENGINE

(75) Inventors: Michael Hoffmann, Weinstadt (DE); Uwe Kreckel, Unterensingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/936,339

(22) PCT Filed: Mar. 10, 2000

(86) PCT No.: PCT/EP00/02114

§ 371 (c)(1),
(2), (4) Date: May 10, 2002

(87) PCT Pub. No.: WO00/53906

PCT Pub. Date: Sep. 14, 2000

(30) Foreign Application Priority Data

Mar. 12, 1999 (DE) .......................................... 199 11 023

(51) Int. Cl.⁷ ............................................... F02B 17/00
(52) U.S. Cl. ..................... 123/295; 123/298; 123/310
(58) Field of Search ................. 123/295, 298, 123/305, 310, 301; 313/128, 140

(56) References Cited

U.S. PATENT DOCUMENTS

| | | | | |
|---|---|---|---|---|
| 4,844,025 A | * | 7/1989 | Sheaffer ..................... | 123/310 |
| 5,211,145 A | | 5/1993 | Ichikawa et al. ........... | 123/295 |
| 5,724,937 A | * | 3/1998 | Bezner et al. .............. | 123/275 |
| 6,064,143 A | * | 5/2000 | Kagawa ...................... | 313/141 |
| 6,176,215 B1 | * | 1/2001 | Baur et al. .................. | 123/295 |
| 6,543,408 B1 | * | 4/2003 | Ernst et al. ................. | 123/295 |
| 6,543,409 B2 | * | 4/2003 | Bertsch et al. ............. | 123/295 |
| 6,575,132 B1 | * | 6/2003 | Ernst et al. ................. | 123/295 |

FOREIGN PATENT DOCUMENTS

| | | |
|---|---|---|
| DE | 195 46 945 | 6/1997 |
| EP | 0 835 994 | 4/1998 |
| GB | 2 112 859 | 7/1983 |
| JP | 59-173566 | 10/1984 |
| JP | 61-031669 | 2/1986 |
| JP | 08-246878 | 9/1996 |

* cited by examiner

*Primary Examiner*—Mahmoud Gimie
*Assistant Examiner*—Arnold Castro
(74) *Attorney, Agent, or Firm*—Kenyon & Kenyon

(57) ABSTRACT

In internal combustion engines having direct injection, an injector injects fuel into the combustion chamber to form an ignitable fuel/air mixture with combustion air supplied separately, the mixture being ignitable by a spark plug. The fuel is injected in a conical pattern, and the electrodes are protected from wetting by fuel and from coking if they are located outside the lateral surface of the fuel cone produced by the injection nozzle. To introduce an ignitable mixture between the electrodes and to ensure optimum operating performance of the internal combustion engine by improving the combustion process, a combustion chamber is configured so that the fuel cone is injected in a free jet which is substantially completely unaffected by the combustion chamber perimeter, and the electrodes of the spark plug project into a fuel vortex emerging from the lateral surface during injection. Electrodes are provided at different spark positions relative to the lateral surface to which the positive potential of the ignition voltage may be applied alternately for ignition of the fuel vortices as a function of the operating point of the internal combustion engine.

13 Claims, 3 Drawing Sheets

DIRECT INJECTION SPARK IGNITION ENGINE

FIELD OF THE INVENTION

The present invention relates to a gasoline engine having direct injection.

BACKGROUND INFORMATION

In direct injection gasoline engines, a combustion chamber in each cylinder is delimited by a longitudinally movable piston and the inside wall of a cylinder head, with an injector injecting fuel into the combustion chamber to form a mixture internally with combustion air supplied separately. The composition of the fuel/air mixture must be within the ignitable window in order to be ignitable by a spark which can be triggered between the electrodes of a spark plug.

German Published Patent Application No. 195 46 945 describes a direct injection internal combustion engine in which injectors with their injection nozzles inject fuel in a conical pattern into the combustion chamber, the spark plug being arranged in such a way that its electrodes are outside the lateral surface of the cone of fuel produced by the injection nozzle. This prevents fuel from wetting the electrodes during the injection operation and counteracts deposits of carbon on the electrodes due to incompletely burned fuel. The electrodes are free of coking over a long period of operation, which should thus guarantee proper functioning of the internal combustion engine without misfiring. To introduce an ignitable mixture between the electrodes arranged outside the cone of fuel, the spark plug is arranged so that the ground electrode is a short distance away from the lateral surface of the fuel cone and the inside wall of the cylinder head extends parallel to the lateral surface of the fuel cone, thus forming an interspace at least at the location where the electrodes of the spark plug are arranged.

A turbulent flow composed of the fuel/air mixture and extending into the area of the electrodes should be formed in this interspace. To generate a turbulent flow, a special shaping of the inside wall and arrangement of the spark plug near the injector are necessary. The injector is arranged in a counterbored hole in the inside wall, i.e., it is set back from the free combustion chamber volume, so that the vortex of mixture should be formed in the area adjacent to the injection nozzle and should circulate in the hollow space formed in the area of the injection nozzle between the lateral surface of the fuel cone and the inside wall of the cylinder head. In addition, air displaced by fuel injected into the combustion chamber should flow back through the air gap between the fuel cone and the parallel inside wall of the cylinder head, which is also conical. Additional fuel particles should be entrained from the fuel cone during the flow back to the spark plug along the inside wall. Turbulent flow is formed in the area near the injector to a great enough extent to introduce an ignitable mixture between the electrodes of a spark plug. The spark plug must therefore be arranged close to the injector.

With a conventional direct injection gasoline engine, the perimeter of the combustion chamber must be formed precisely and at great expense by the inside wall of the cylinder head in particular in order to achieve the desired hydrodynamic effects to form the ignitable mixture vortex. The conventional combustion chamber configuration having the combustion chamber shape required to form a mixture vortex and having the spark plug necessarily arranged near the injector often does not yield an optimum combustion and cannot guarantee the desired operating performance of the internal combustion engine.

It is an object of the present invention to provide a direct injection gasoline engine in which the engine will operate at an optimum operating performance.

SUMMARY

In the case of the combustion chamber configuration according to the present invention, the fuel cone is injected in a free jet which is substantially unaffected by the perimeter of the combustion chamber, i.e., the cone of fuel is injected at such a great distance in particular from the inside wall of the cylinder head, that the conical fuel jet spreads out in the free volume of the combustion chamber substantially without hydromechanical wall effects of the combustion chamber perimeter. In injection, vortices of fuel are formed, emerging from the lateral surface of the cone and composed at first mainly of fuel vapors mixing with the surrounding combustion air in the combustion chamber. Fuel vortices develop to an especially great extent when the cone angle of the fuel cone is between 70° and 100°, and they are produced by an air flow developing in the area of the lateral surface of the fuel cone due to the air entrained by the fuel jet, with an air flow also being produced in the opposite direction due to the resulting vacuum. The spark plug is positioned according to the present invention so that the electrodes project into the fuel vortex of the free jet. The spark position of the electrodes may be 1 mm to 15 mm from the lateral surface of the fuel cone.

The fuel vortex which brings ignitable mixture between the electrodes is formed on the lateral surface of the free jet without any effective influence on the part of the perimeter of the combustion chamber, so that the shape of the combustion chamber may be configured freely. This is a jet-guided combustion method in which wall effects of the inside wall of the cylinder head or a piston recess have hardly any effect on formation of the mixture or on ignition. Especially in stratified charge operation of an internal combustion engine when operating with fuel injection during the compression stroke and with the combustion chamber filled with air, a central cloud of fuel is formed so that optimum combustion of the combustion chamber charge may be achieved with a simple combustion chamber configuration. Another advantage of the formation of the mixture according to the present invention is that the spark plug may be arranged at a greater distance from the injector. The fuel vortex is then at the same location in the combustion chamber for a longer period of time, so that ignition may occur independently of the injection time over a wide interval.

The free jet of fuel may be injected into the combustion chamber in the form of a hollow cone. In this way, the fuel vortices develop in a form that is particularly suitable for transporting the mixture toward the spark plug, particularly in the case of injection under a high cylinder pressure in the compression phase during stratified charge operation. It is particularly simple to produce a cone of fuel having a hollow conical shape if the injector has an injection nozzle that opens outwardly.

Fuel vortices develop out of the fuel cone in different zones on the lateral surface as a function of the load and the rpm of the internal combustion engine. To obtain the most optimum spark position in the fuel vortex in ignition and thereby improve ignition and complete combustion of the mixture in the combustion chamber, at least two electrodes to which the positive potential of the ignition voltage may be applied are provided at different spark positions relative to the lateral surface of the fuel cone. According to the prevailing operating load and/or rpm of the internal combustion engine, the spark is triggered between the optimally positioned electrode having a positive potential relative to the fuel vortex and the respective ground electrode.

To guarantee theoretically optimal combustion of the fuel/air mixture, an infinitely adjustable spark position relative to the edge vortex as a function of load and rpm is necessary. With several electrodes to which the positive potential of the ignition voltage may be applied, theoretically optimal ignition of the edge vortex may be approximated if the electrodes are arranged at different spark positions relative to the lateral surface of the fuel cone. In the case of an arrangement of two electrodes to which the positive potential may be applied, the electrodes may be arranged so that the possible lateral surface zone in which fuel vortices are manifested is completely covered with the corresponding spark positions.

The electrodes having a positive potential may be arranged at different depths of penetration in the combustion chamber. For reliable coverage of the fuel vortices in different load and rpm ranges through ignition in the optimum spark position, it may be advantageous to arrange the electrodes having a positive potential at different distances from a central axis of the cylinder. The electrodes having a positive potential may have different alignments of their longitudinal axes relative to the central axis of the cylinder.

Depending on the mode of operation (stratified charge operation/formation of a homogeneous mixture) of the internal combustion engine and the operating conditions, the ignition voltage is applied using a control unit between either one of the electrodes for the positive potential and the respective ground electrodes. Ignition then occurs through the electrode which is in an optimum spark position relative to the existing fuel vortex. A second retarded firing (double firing) may be provided through the additional electrode to support complete combustion of the charge. Simultaneous ignition in several spark positions may also be possible.

In an example embodiment of the present invention, two spark plugs are provided in different positions relative to the fuel jet, each spark plug having a ground electrode and an electrode with a positive potential. The positive potential of the ignition voltage is applied to the central electrode. Ignition in different selectable spark positions as a function of load and rpm may also be accomplished through a single spark plug having electrodes of different axial lengths to which the positive potential of the ignition voltage may be applied.

DETAILED DESCRIPTION

Figure 1:
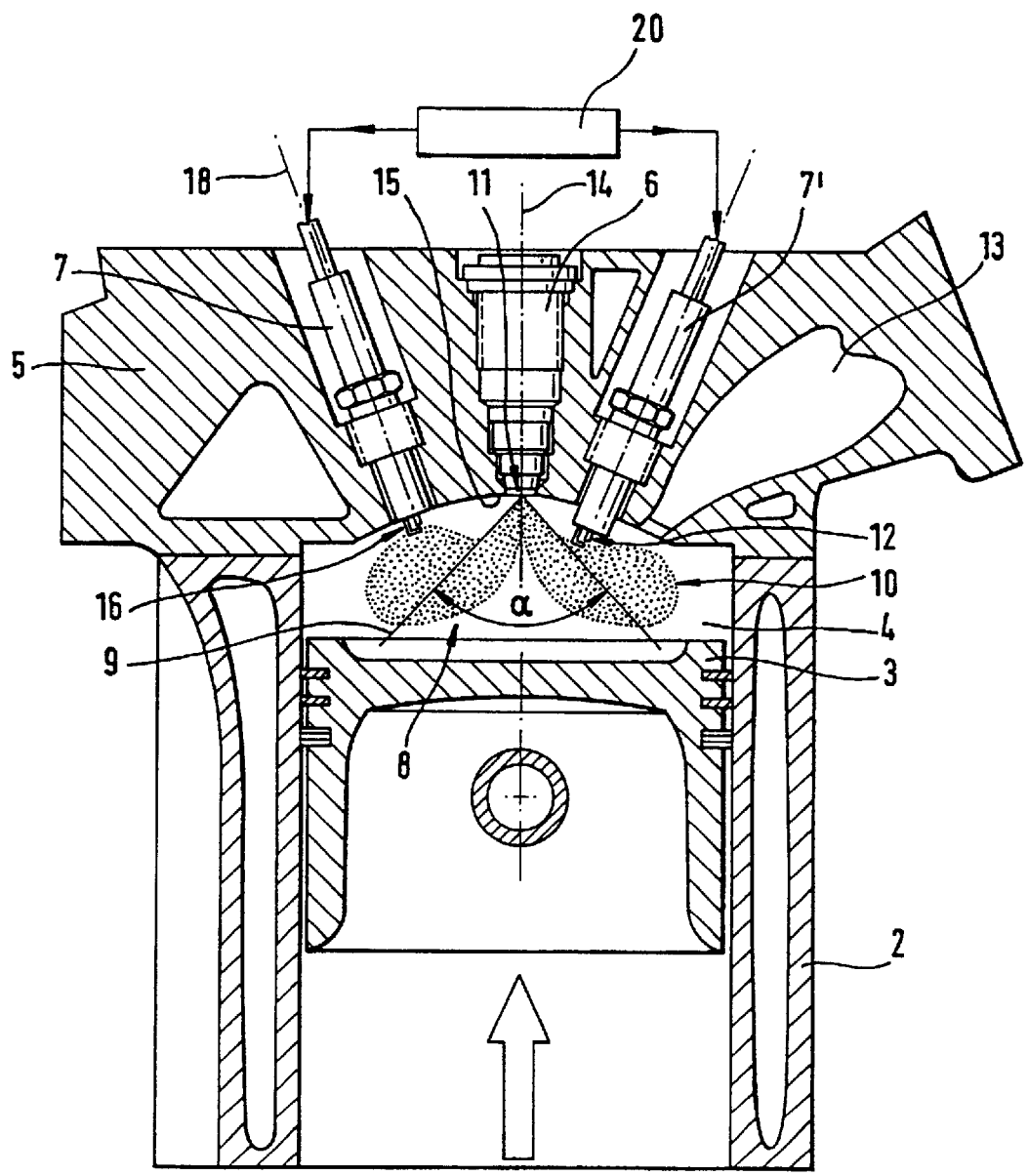
FIG. 1 is a longitudinal cross-sectional view through a gasoline engine.

FIG. 1 illustrates a direct injection gasoline engine 1 in the cylinder 2 of which arranged a piston 3 to move longitudinally, delimiting a combustion chamber 4 with inside wall 15 of a cylinder head 5 mounted on cylinder 2. A fuel injector 6 arranged in cylinder head 5 centrally on central axis 14 of the cylinder injects fuel directly into combustion chamber 4 aimed at piston 3. Combustion air required to form the internal mixture is supplied to combustion chamber 4 through an inlet channel 13. Two spark plugs 7, 7', the electrodes 12, 16 of which project into combustion chamber 4, are arranged in cylinder head 5, with a spark being triggered between electrodes 12 and 16 at the time of ignition, striking through the ignitable mixture in combustion chamber 4 when it sparks over. A control unit 20 determines which spark plug 7, 7' is to form a spark as a function of the load and the rpm of internal combustion engine 1, and it applies the positive potential of the ignition voltage to central electrode 16 of selected spark plug 7, 7'. If necessary, both spark plugs 7, 7' may also be used for ignition.

Injector 6 includes an outwardly opening injection nozzle 11 which produces a hollow conical jet of fuel that widens in the direction of the piston. Electrodes 12, 16 of spark plug 7 are located outside lateral surface 9 of fuel cone 8 produced by injection nozzle 11, and thus they do not become wetted with fuel during the injection operation.

In the present example embodiment of the present invention, the injector is operated piezoelectrically, injection nozzle 11 being opened and closed in a rapid and accurately adjustable manner by a piezoelectric element. Other forms of injector actuators may also be provided. The formation of the desired free jet shape of the fuel cone is promoted by the proper choice of the injection time and its accurate observance during the working cycle via piezoelectric operation of the injector.

The internal combustion engine functions in stratified charge operation in wide ranges of the engine characteristics map, fuel being injected during the compression cycle of cylinder 2. Because of the late fuel injection during the working cycle, a stratified combustion chamber charge having local differences in fuel concentration develops, with a very lean mixture formed or pure air outside fuel cone 8.

To introduce an ignitable mixture between electrodes 12 and 16 of spark plugs 7, 7', the internal combustion engine has a combustion chamber configuration such that fuel cone 8 is injected in a free jet which is substantially unaffected by the perimeter of the combustion chamber formed by cylinder head inside wall 15. Lateral surface 9 of fuel cone 8 may be located at a great distance from inside wall 15, in which case fuel vortices 10 emerging out of lateral surface 9 develop on the free jet which is free of the influence of the wall of the combustion chamber perimeter. Cone angle α of fuel cone 8 is between 70° and 100°, and fuel vortices 10 are formed to an particularly great extent on the edge of the cone.

Fuel vortices 10 develop because of air flow in the area of lateral surface 9 of the fuel cone due to air entrained by the fuel jet, an air flow also being produced in the direction opposite this flow due to the resulting vacuum. Fuel vortices 10 convey fuel to combustion chamber areas far outside of fuel cone 8 where they mix with the combustion air.

Spark plugs 7, 7' are arranged so that their electrodes 12, 16 project into mixture vortex 10. Even in the area of the combustion chamber outside of fuel cone 8, where electrodes 12 are protected from direct wetting by fuel, an ignitable mixture may thus be supplied to spark plugs 7, 7' with fuel vortices 10 that are obtained with free jet injection.

Fuel vortices 10 develop almost regardless of the shape of the combustion chamber, and therefore inside wall 15 of cylinder head 5 may be configured as desired. The free jet in injection has the shape of a hollow cone, so a large portion of the total quantity of fuel injected is carried in lateral surface 9 of conical stream 8 and thus may be covered by fuel vortices 10. The ignition point may be varied in a wide range, substantially independently of the injection time, and it may be adjusted as needed because the fuel vortices are stable in the combustion chamber over a long period of time and fuel is still present on at least one of spark plugs 7, 7' approximately 50° of crankshaft angle after the end of injection.

Fuel vortices 10 develop at different locations on lateral surface 9 of fuel cone 8 as a function of the load and rpm of internal combustion engine 1. To guarantee optimum ignition and combustion of the mixture at any operating point of internal combustion engine 1, spark plugs 7, 7' are arranged at different spark positions with respect to lateral surface 9 of fuel cone 8. Spark plugs 7, 7' project to different distances into combustion chamber 4 in the direction of their longitudinal axes 18, so that their respective central electrodes 16 to which the positive potential of the ignition voltage may be applied are located at different distances from lateral surface 9. Depending on the operating point, the ignition voltage is applied by control unit 20 to spark plug 7, 7', the spark position of which is located at the depth of penetration into combustion chamber 4 where fuel vortices 10 occur at the respective operating point.

The spark positions of both spark plugs 7, 7' which are available for ignition also differ with regard to their distance from longitudinal axis 14 of the cylinder, the spark positions being adjusted in the engine characteristics map of the internal combustion engine to the position of emerging fuel vortices 10 through the arrangement of spark plugs 7, 7', taking into account the combustion chamber configuration, e.g., the geometry of the combustion chamber. Spark plugs 7, 7' are arranged so that the entire conical surface zone between the two extreme positions in which fuel vortices occur may be covered reliably by one of the two spark plugs at the time of the ignition. The spark positions need not be at the extreme points. Another possibility of adjusting the spark positions to the development of fuel vortices in the engine characteristics map of the internal combustion engine is possible through an appropriate arrangement of spark plugs 7' with different alignments of their longitudinal axes 18 relative to central axis 14 of the cylinder.

Both spark plugs 7, 7' may be of the same design and may differ with regard to the spark position, which is determined by the position of central electrode 16, to which the positive potential of the ignition voltage may be applied, and of ground electrode 12. However, it is also possible to use spark plugs having different spark gaps for adjusting the different spark positions to the development of fuel vortices in the possible lateral surface zone area. In doing so, the distance between the central electrode for the positive potential of the ignition voltage and the ground electrode is different. Possible geometric disadvantages of the arrangement of a spark plug 7, 7' may be compensated, taking into account the desired geometry of the combustion chamber, if the position of the spark plug intended for optimum edge vortex ignition is not available for design reasons such as the arrangement of the charge cycle valves.

Control unit 20 selects spark plug 7, 7', the electrode 12, 16 of which is inside fuel vortex 10, which develops at the prevailing operating point, depending on measured values entered of the operating load and the rpm of internal combustion engine 1. The mode of operation of the internal combustion engine and the associated characteristics of formation of the mixture (stratified charge operation/homogeneous mixture formation) are also taken into account. At certain operating points of the internal combustion engine, double firing may be advantageous through concatenated firing of both plugs 7, 7' to support reliable ignition of fuel vortices 10. Double firing may optionally also occur simultaneously.

Because of the stability of fuel vortices 10 and the long period of time available for ignition, spark plug 7 may also be arranged at a relatively great distance from injector 6 in the cylinder head, greatly simplifying the combustion chamber configuration and the design of cylinder head 5. The distance of the spark position according to the arrangement of electrodes 12 relative to the injection nozzle may be between 7 mm and 30 mm. The spark position is between 1 mm and 15 mm away from lateral surface 9 of fuel cone 8. The distance of electrodes 12 from fuel cone 8 is selected according to the desired operating performance in the respective application case of direct injection gasoline engine 1.

Figure 2:
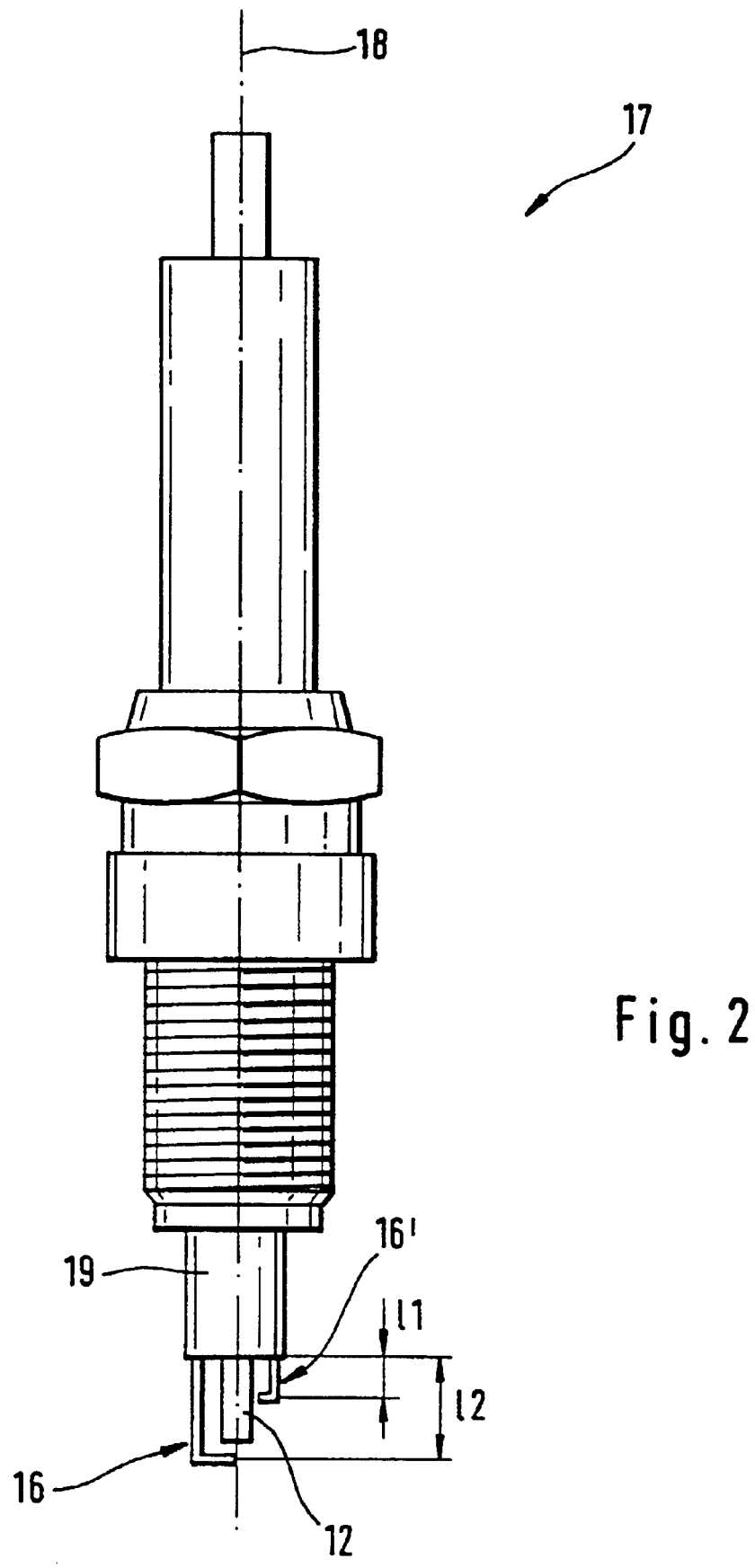
FIG. 2 is a side view of a spark plug having two spark positions.

FIG. 2 illustrates a spark plug 17 having two electrodes 16, 16' to which the positive potential of the ignition voltage may be applied by the control unit for alternative production of sparks in different spark position relative to the lateral surface of the fuel cone injected into the combustion chamber. Both electrodes 16, 16' are jointly paired with a central ground electrode 12 to which a spark jumps over when sparkover voltage is applied between ground electrode 12 and electrodes 16, 16' which are provided for the positive potential. Both electrodes 16, 16' which may be selected for the positive potential of the ignition voltage are grouped around ground electrode 12 at a distance from longitudinal axis 18 and differ with regard to their extent in the direction of longitudinal axis 18 starting from an insulator 19 in the end area of spark plugs 17. Insulator 19 which surrounds electrodes 16, 16' and ground electrode 12 prevents unwanted sparkover of the spark apart from the intended spark position.

Length 12 of one electrode 16 is greater than axial length 11 of second electrode 16'. Electrodes 12, 16, 16' project into the combustion chamber in the installed position of spark plug 17 in the cylinder head of the internal combustion engine, with sparks capable of forming at different distances from the fuel cone due to different axial lengths 11, 12. Depending on the prevailing operating load and rpm of the internal combustion engine and the operating mode of the internal combustion engine, the spark is triggered by the control unit in the optimum spark position for the operating point.

Figure 3:
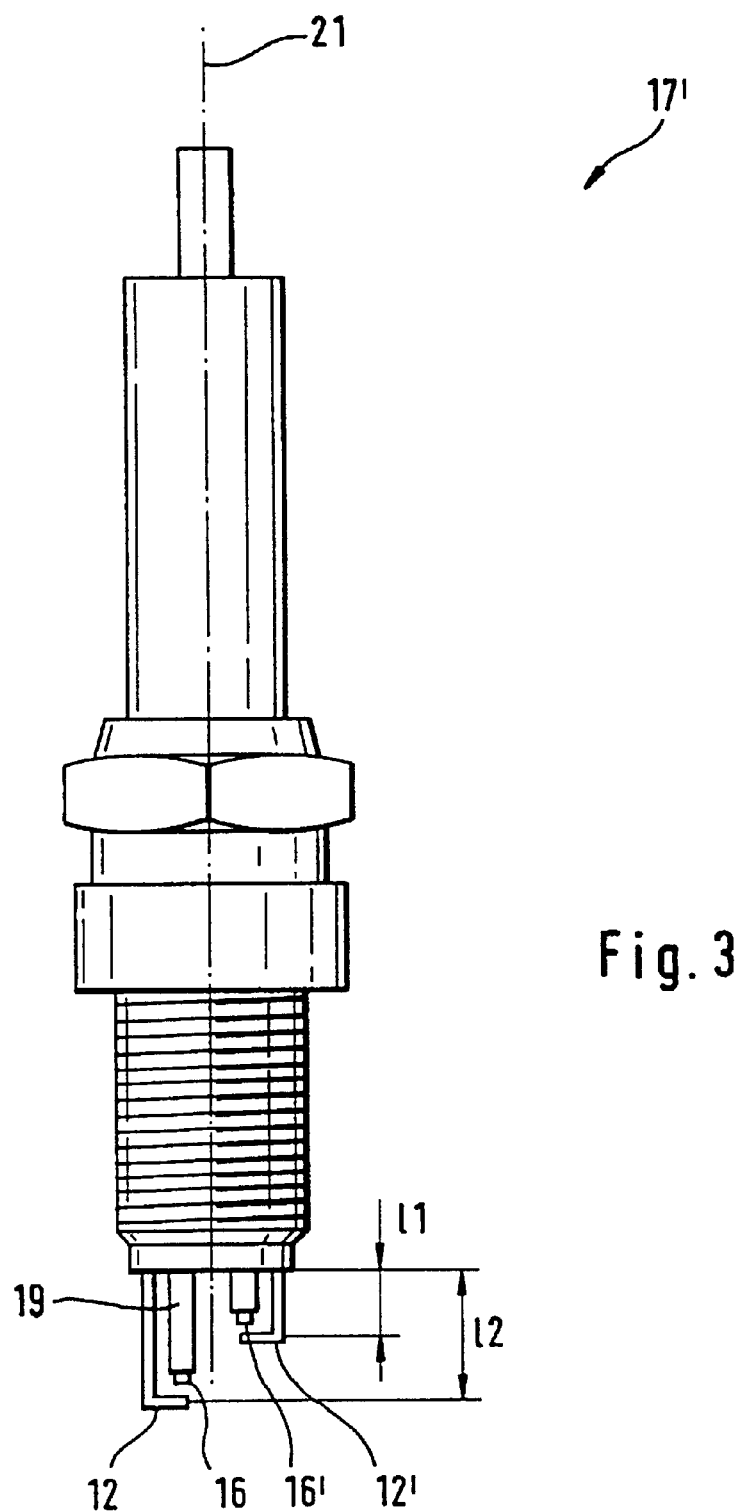
FIG. 3 is a side view of another spark plug having two spark positions.

FIG. 3 illustrates a spark plug 17' having two electrodes 16, 16' to which the positive potential of the ignition voltage may be applied. Each electrode 16, 16' is paired with a ground electrode 12, 12' to which the spark jumps when the ignition voltage is applied to selected electrode 16, 16'. The electrodes for the positive potential of the ignition voltage and respective ground electrodes 12, 12' differ by their axial lengths L1, L2, with a spark being triggerable deeper in the combustion chamber by applying a voltage to positive electrode 16 having greater length L2 than other electrodes 16' having the smaller axial extent L1. Electrodes 16, 16' for the positive potential in this example embodiment of a spark plug for two spark positions are adjacent to a central axis 21 of the spark plug. The ground electrodes are on the opposite side of central axis 21 with respect to corresponding positive electrodes 16, 16'. The positive electrodes are mounted in an insulator 19 to ensure that the spark will jump from the respective electrode tip to ground electrodes 12, 12' provided.

What is claimed is:
1. A direct injection gasoline engine, comprising:
   a combustion chamber delimited by a longitudinally movable piston and an inside wall of a cylinder head in each cylinder;

an injector having an injection nozzle configured to inject fuel in a conical pattern into the combustion chamber to form an ignitable fuel/air mixture with separately supplied combustion air; and a spark plug configured to ignite the fuel/air mixture, the spark plug having electrodes located outside a lateral surface of a fuel cone produced by the injection nozzle;

wherein the combustion chamber is configured so that the fuel cone is injected in a free jet substantially unaffected by a perimeter of the combustion chamber;

wherein the electrodes of the spark plug project only into a fuel vortex that develops from the lateral surface at a time of injection;

wherein at least two electrodes to which a positive potential of an ignition voltages is applied are provided in different spark positions relative to the lateral surface of the fuel cone; and wherein a cone angle of the fuel cone is between 70° and 100°.

2. The gasoline engine according to claim 1, wherein the free jet injection is in the form of a hollow cone.

3. The gasoline engine according to claim 1, wherein the positive potential electrodes are arranged at different depths of penetration in the combustion chamber.

4. The gasoline engine according to claim 1, wherein the positive potential electrodes are arranged at different distances from a central axis of the cylinder.

5. The gasoline engine according to claim 1, wherein the positive potential electrodes are arranged with different alignments of a longitudinal axis with respect to a central axis of the cylinder.

6. The gasoline engine according to claim 1, further comprising a control unit configured to select an ignition position between one of the positive potential electrodes and a respective ground electrode as a function of a mode of operation and at least one operating condition of the gasoline engine.

7. The gasoline engine according to claim 1, wherein the gasoline engine includes two spark plugs, each having a ground electrode and a positive potential electrode.

8. The gasoline engine according to claim 7, wherein the positive potential electrodes include a central middle electrode.

9. The gasoline engine according to claim 1, wherein the spark plug includes the at least two electrodes, the positive potential electrodes having different axial lengths.

10. The gasoline engine according to claim 9, wherein the spark plug includes a central ground electrode corresponding to the positive potential electrodes.

11. The gasoline engine according to claim 9, further comprising a ground electrode corresponding to each of the positive potential electrodes, the ground electrodes having different axial lengths.

12. The gasoline engine according to claim 11, wherein the positive potential electrodes are arranged centrally near a central axis of the spark plug and the ground electrodes are arranged on an opposite side of the central axis with respect to a corresponding positive potential electrode.

13. The gasoline engine according to claim 1, wherein the internal combustion engine is configured to be operated with charge stratification and fuel injection during a compression stroke in a wide range of an engine characteristics map.

* * * * *